United States Patent [19]

Mayer et al.

[11] 4,082,723
[45] Apr. 4, 1978

[54] AZA-ADAMANTANE COMPOUND STABILIZERS FOR ORGANIC POLYMER COMPOSITIONS

[75] Inventors: Norbert Mayer, Gersthofen; Gerhard Pfahler, Augsburg; Hartmut Wiezer, Gersthofen, all of Germany

[73] Assignee: Hoechst Aktiengesellschaft, Frankfurt am Main, Germany

[21] Appl. No.: 729,483

[22] Filed: Oct. 4, 1976

[30] Foreign Application Priority Data

Oct. 9, 1975 Germany .............................. 2545292

[51] Int. Cl.² .......................... C08K 5/34; C08K 5/35
[52] U.S. Cl. .......................... 260/45.8 N; 60/45.8 R; 260/45.8 NT; 260/45.8 NZ; 260/45.8 SN
[58] Field of Search ................ 260/45.8 N, 45.8 NZ, 260/45.8 SN, 45.8 NT, 45.8 R; 526/50, 193, 204, 205

[56] References Cited

U.S. PATENT DOCUMENTS

| | | | |
|---|---|---|---|
| 3,812,065 | 5/1974 | Minieri | 260/45.8 NT |
| 3,879,396 | 4/1975 | Ramey et al. | 260/45.8 N |
| 3,883,477 | 5/1975 | Stephen | 260/45.8 N |
| 3,912,742 | 10/1975 | Stephen | 260/45.8 N |

FOREIGN PATENT DOCUMENTS 506,219  3/1975  Japan.

*Primary Examiner*—V. P. Hoke
*Attorney, Agent, or Firm*—Connolly and Hutz

[57] ABSTRACT

Certain aza-adamantane compounds are suitable for stabilizing polymers against degradation by light and heat.

It is known that ultraviolet radiation, especially in the near-ultraviolet range, has an adverse effect on the aspect and physical properties of organic polymers. Thus, for example, polyolefins and polyurethane elastomers tend to heavy degradation when they are exposed to light, that is, sun rays or ultraviolet radiation. Polyvinyl chloride and polyvinylidene chloride are discolored and also degraded under the above conditions, and polyamides too are often subjected to photo-degradation.

Numerous stabilizers have been hitherto proposed for stabilizing synthetic polymers against photo-degradation, for example benzophenone and benzotriazole compounds for polyolefins, phenol and benzophenone compounds for polyurethanes, and salts of barium or cadmium and organic tin compounds for polyvinyl chloride and polyvinylidene chloride. Recently, 2,2,6,6-tetraalkylpiperidine derivatives have been proposed as stabilizers. However, on incorporation into the polymer, the dust of the latter compounds, due to their heavy basicity, may physiologically affect the mucous membranes.

It has now been found that aza-adamantane compounds of the structure

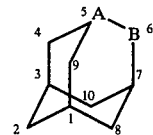

where at least either A is a nitrogen atom and B an optionally substituted methylene group, or A is an optionally substituted methine group and B an imino group, are excellent stabilizers for polymers.

3 Claims, No Drawings

AZA-ADAMANTANE COMPOUND STABILIZERS FOR ORGANIC POLYMER COMPOSITIONS

The present invention therefore relates to the use of aza-adamantane compounds of the formulae

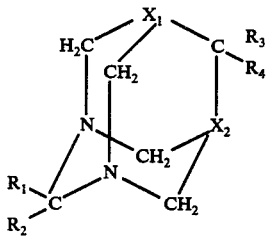
(I)

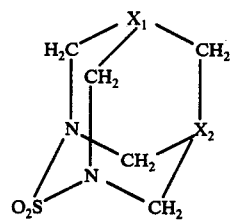
(II)

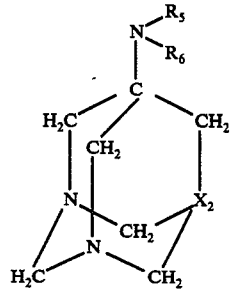
(III)

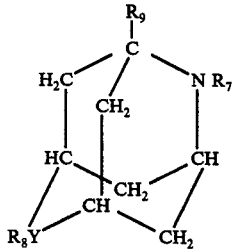
(IV)

where
- $X_1$ is a nitrogen or phosphorus atom, a phosphoryl or thiophosphoryl group, or a methine group optionally substituted by a phenyl or methyl group;
- $X_2$ is a nitrogen atom or a methine group optionally substituted by an aryl group;
- $R_1$ and $R_2$ each are a hydrogen atom, an alkyl group having from 1 to 20 carbon atoms, which may be identical or different and may form together an alkylene group completing the ring to have 5 to 7 members;
- $R_3$ and $R_4$ each are a hydrogen atom or form together an oxygen atom;
- $R_5$ is a hydrogen atom, a hydroxyl or methyl group;
- $R_6$ is a hydrogen atom, an alkyl group having from 1 to 30 carbon atoms or an aryl group;

is a nitro group;
- Y is a nitrogen atom;
- $R_7$ and $R_8$ each are a hydrogen atom, a methyl or benzyl group, an oxygen atom or a tosyl group;
- $R_9$ is a hydrogen or halogen atom, a hydroxyl or amino group; and
- $R_8-Y <$ optionally is a methylene group or oxygen atom; for the stabilization of synthetic polymer compositions against decomposition by light and heat.

The aza-adamantane compounds used in accordance with this invention are known substances, and their preparation is described in the literature, for example by E. B. Hodge, J. Org. Chem. 1972, 2 (37), 320 – 321; A. T. Nielsen, J. Heterocyclic Chem. 12 (1975), 1, 161 – 164; D. J. Daigle et al., J. Heterocyclic Chem. 11 (1974), 1085 – 1086; R. M. Dupeyre et al., Tetrahedr. Lett. 29 (1973), 2699 – 2701; H. Stetter et al., Tetrahedr. Lett. 19 (1972), 1907 – 1908; F. Gralinowsky et al., Monatsh. Chem., 86 (1955), 499; H. Stetter et al., Chem. Ber., 91 (1958), 598; H. Stetter et al., Chem. Ber., 84 (1951), 834; S. F. Nelsen et al., J. Am. Chem. Soc. 94 (1972), 7114 – 7117; E. Fluck et al., Chemiker Zeitung, 99 (1975), 246 – 247.

Examples of these compounds are the following (m.p. = melting point; D = decomposition point):
N-tosyl-2-azaadamantane, m.p. 105° – 107° C; 2-azaadamantane, m.p. 262° – 265° C; N,N'-ditosyl-2,6-diazaadamantane, m.p. 247° – 249° C; 2,6-diazaadamantane, m.p. 238° C; N,N'-dimethyl-2,6-diazaadamantane, m.p. 7° C; N-methyl-N'-benzyl-2,6-diazaadamantane, m.p. 260° C; N-methyl-2,6-diazaadamantane; N-methyl-N'-oxyl-2,6-diazaadamantane, m.p. 204° C; N-oxyl-2,6-diazaadamantane, m.p. 192° C; N,N'-dioxyl-2,6-diazaadamantane, m.p. 240° C; 1,3-diazatricyclo[3,3,1,1]decane, m.p. 262° C; 1,3-diphenyl-5,7-diazatricyclo[3,3,1,1]decane, m.p. 212° – 216° C; 1,3-diphenyl-5,7-diazatricyclo[3,3,1,1]decane-2-one, m.p. 257° – 259° C; 2,2-cyclopentamethylene-1,3-diazatricyclo[3,3,1,1]decane, m.p. 123° – 124.5° C; 1-methyl-3,5,7-triazatricyclo[3,3,1,1]decane, m.p. 175° C; hexamethylenetetramine, D 230° – 260° C; 1,3,5-triaza-7-phosphaadamantane, D 263° C; 1,3,5-triaza-7-phosphaadamantane-7-oxide, D 266° C; 1,3,5-triaza-7-phosphaadamantane-7-sulfide, m.p. 270° C; 2-thia-1,3,5-triaza-7-phosphaadamantane-2,2-dioxide, D 279° C; 2-thia-1,3,5-triaza-7-phosphaadamantane-2,2,7-trioxide, m.p. 145° – 246° C; 7-nitro-1,3,5-triazaadamantane, D 285° – 310° C; 1,3,5-triaza-7-adamantylamine, m.p. 218° – 220° C; 1,3,5-triaza-7-adamantyl-hydroxylamine, m.p. 227° – 229° C;
7-(ethylamino)-1,3,5-triazaadamantane, m.p. 126° – 129° C;
7-(n-propylamino)-1,3,5-triazaadamantane, m.p. 103° – 104° C;
7-(n-butylamino)-1,3,5-triazaadamantane, m.p. 112° – 114° C;
6-(n-pentylamino)-1,3,5-triazaadamantane, m.p. 110° – 120° C;
7-(n-hexylamino)-1,3,5-triazaadamantane, m.p. 118° – 120° C;

7-(i-butylamino)-1,3,5-triazaadamantane, m.p. 154° – 156° C;

7-(n-heptylamino)-1,3,5-triazaadamantane, m.p. 124° – 125° C;

7-(N,N-dimethyl)-1,3,5-triazaadamantane, m.p. 110° – 111° C;

7-(N-methyl-N-ethyl)-1,3,5-triazaadamantane, m.p. 87° – 89° C;

7-(N-methyl-N-n-propyl)-1,3,5-triazaadamantane, m.p. 57° – 60° C;

7-(N-methyl-N-n-butyl)-1,3,5-triazaadamantane, m.p. 35° – 38° C;

7-(N-methyl-N-n-pentyl)-1,3,5-triazaadamantane, m.p. 32° – 35° C;

7-(N-methyl-N-n-hexyl)-1,3,5-triazaadamantane, m.p. 28° – 30° C;

7-(1-piperidyl)-1,3,5-triazaadamantane, m.p. 166° – 172° C;

4-thia-1,3,5,7-tetraazaadamantane-4,4-dioxide, m.p. 225° C;

2,8,10-trioxa-5-azaadamantane, D 210° – 220° C.

By synthetic polymer compositions to be stabilized against the adverse influence of light and heat there are to be understood polyolefins including polyisoprene, polybutadiene, polystyrene, polypropylene and polyethylene of low or high density, other olefin homopolymers and ethylene/propylene copolymers, ethylene/butene copolymers, ethylene/vinyl acetate copolymers, styrene/butadiene copolymers, acrylonitrile/styrene/butadiene copolymers, other copolymers of other ethylenically unsaturated monomers and olefins; furthermore polyvinyl chloride and polyvinylidene chloride including homopolymers of vinyl chloride and vinylidene chloride, copolymers of vinyl chloride with vinylidene chloride, copolymers of vinyl chloride or vinylidene chloride with vinyl acetate or other olefinically unsaturated monomers; polyacetals, polyesters, for example polyethylene terephthalate; polyamide; for example nylon-6, nylon 6,6 and nylon-6,10; polyurethane and epoxy resins.

The amount of aza-adamantanes to be added to the synthetic polymers may widely very, depending on the kind, the properties and the special applications of the polymer which is to be stabilized. Generally, from 0.01 to 5% by weight, preferably from 0.1 to 3, and especially from 0.5 to 3% by weight, relative to the amount of synthetic polymer, are employed. It is possible to use one compound per se as well as a mixture of several of them.

The aza-adamantane compounds are incorporated into the synthetic polymers according to known methods. For example, the stabilizer in the form of a dry powder may be blended with the synthetic polymer, or a solution, suspension or emulsion of the stabilizer may be incorporated into a solution, suspension or emulsion of the synthetic polymer.

The aza-adamantane type stabilizers are efficient per se as well as in admixture with usual light and heat stabilizers on the basis of phenolic, sulfidic or phosphorus containing antioxidants.

By usual stabilizers, there are to be understood in detail: for example 2,6-di-tert.-butyl-p-cresol, 3,5-di-tert.-butyl-4-hydroxyphenylpropionic acid ester, alkylidene-bis-alkylphenols, thiodipropionic acid esters of fatty alcohols or dioctadecylsulfide or -disulfide. Phosphorus containing substances are for example trisnonylphenylphosphite, distearylpentaerythrityl-diphosphite, esters of pentaerythritol-phosphite etc. Examples of UV absorbers are benzotriazole compounds such as 2-(2'-hydroxy-5'-methylphenyl)-benzotriazole, and quenchers are for example the novel piperidine stabilizers and metal chelates.

A synergistically active stabilizer combination for stabilizing halogen-free poly-α-olefins such as low-, medium- and high-density polymers of $C_2$ to $C_4$-α-olefins, especially polyethylene and polypropylene, or of copolymers of such α-olefins is for example composed, per 100 parts by weight of polymer, of 0.01 to 3 parts by weight of an aza-adamantane to be use in accordance with this invention, 0.05 to 3 parts by weight of a phenolic stabilizer, 0.1 to 3 parts by weight of a sulfidic stabilizer and optionally 0.1 to 3 parts by weight of a phosphite and/or 0.01 to 3 parts by weight of an UV stabilizer from the series of alkoxyhydroxybenzophenones, hydroxyphenylbenzotriazoles, salicylic acid phenol esters, benzylidene-malonic acid mononitrile esters, the so-called "quenchers" such as nickel chelates, hexamethylphosphoric acid trisamide, or of a representative of Hindered Amine Light Stabilizers known only recently.

In the case of chlorine containing vinyl homo- and copolymers, for example polyvinyl chloride, polyvinylidene chloride, polyvinyl chloroacetate, vinylchloride/α-olefin copolymers or chlorinated polyolefins such as chlorinated polyethylene and polypropylene, the addition of the aza-adamantanes in the presence of metal compounds known as stabilizers, epoxy stabilizers, phosphites and optionally polyols, also brings about an improvement of the heat and light stability.

By metal compounds known as stabilizers, there are to be understood in this connection the following substances: calcium, barium, strontium, zinc, cadmium, magnesium, aluminum and lead soaps of aliphatic carboxylic acids or oxycarboxylic acids having about 12 to 32 carbon atoms, salts of the cited metals with aromatic carboxylic acids such as benzoates or salicylates, acidic (alkyl)-phenolates of these metals, furthermore organotin compounds such as dialkyltin-thioglycolates or -carbonates.

Known epoxy stabilizers are for example epoxidized higher fatty acids such as epoxidized soybean oil, tall oil, linseed oil, epoxidized butyl oleate or the epoxides of long-chain α-olefins.

As phosphites there may be used trisnonylphenylphosphite, trislaurylphosphite or the esters of pentaerythritol-phosphite.

Suitable polyols are for example pentaerythritol, trimethylolpropane, sorbitol or mannitol, that is, above all alcohols having 5 or 6 carbon atoms and from 3 to 6 OH-groups.

A stabilizer combination for stabilizing halogen containing plastic compositions is composed for example, per 100 parts by weight of polymer, of from 0.1 to 10 parts by weight of a metal compound known as stabilizer, from 0.1 to 10 parts by weight of a known epoxy stabilizer, from 0.05 to 5 parts by weight of a phosphite, from 0.1 to 1 part by weight of a polyol and from 0.01 to 5 parts by weight of one of the azaadamantanes in accordance with this invention.

The following examples illustrate the invention.

EXAMPLES 1 to 8

These examples prove the light stabilizing effect of azaadamantanes when used in a poly-α-olefin.

100 parts by weight of polypropylene having a melt flow index of about 6 g/10 min. (determined according to ASTM D 1238-62 T) and a density of 0.96 were blended with 0.10 part by weight of a bis-(4'-hydroxy-3'-tert.-butylphenyl)-butanoic acid ester,
0.15 part by weight of a lauryl-thiodipropionic acid ester,
0.20 part by weight of calcium stearate, and
0.30 part by weight of different aza-adamantanes
and homogenized at 200° C in a twin-cylinder mixer for 5 minutes. Subsequently, the plastics melt was molded at 200° C to form a plate having a thickness of 1 mm. From the cold plate, test specimens were cut according to German Industrial Standard DIN 53 455.

In order to determine the light stability, the specimens were subjected to changing irradiation in a radiation apparatus (R)Xenotest-150 of Messrs. Heraeus Quarzlampen GmbH, Hanau, West Germany. The intensity of irradiation was modulated by 6 IR windows and 1 UV window (DIN 53 387). The hours of irradiation (residence time) after which the absolute elongation at break has dropped to 10% were measured. The elongation at break was determined in a tensile strength test apparatus at a draw-off rate of 5 cm/min.

The results are listed in the following Table. Example 1, for a comparison, shows the residence time attained by a specimen containing the basis stabilizer only.

| Ex. Nr. | Azaadamantane stabilizer | Residence time (hours) |
|---|---|---|
| 1 | none | 560 |
| 2 | 1,3,5,7-tetraazaadamantane | 1610 |
| 3 | 1,3,5-triaza-7-phosphaadamantane | >560 |
| 4 | 1,3,5-triaza-7-phosphaadamantane-7-oxide | >560 |
| 5 | 1,3,5-triaza-7-nitroadamantane | >560 |
| 6 | 1,3,5-triaza-7-aminoadamantane | >560 |
| 7 | 2-thia-1,3,5-triaza-7-phosphaadamantane-2,2-dioxide | >560 |
| 8 | 1,3,5-triaza-7-phosphaadamantane-7-sulfide | >560 |

The result of Example 2 is particularly surprising, since 1,3,5,7-tetra-aza-adamantane is supposed to be a destructor for polyolefins (Japanese Patent Specification No. J 75006/219).

What is claimed is:

1. Organic polymer-containing plastics molding composition having as stabilizer for the polymer against decomposition by light and heat 0.01–5% by weight of the polymer of one or more aza-adamantane compounds of the formula

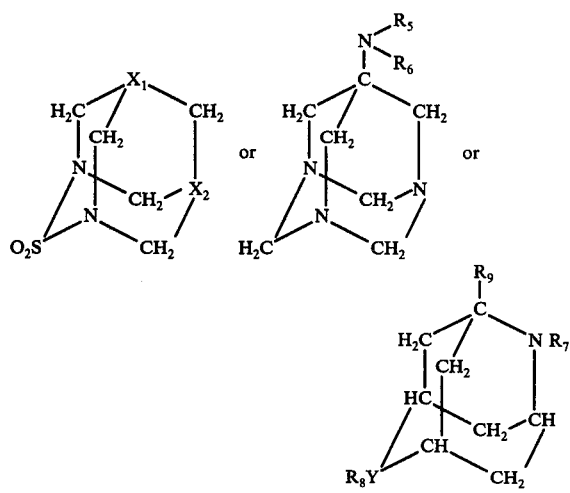

wherein
$X_1$ is nitrogen, phosphorus, phosphoryl, thiophosphoryl, methine, or methine substituted by phenyl or methyl;
$X_2$ is nitrogen, methine, or methine substituted by aryl;
$R_5$ is hydrogen, hydroxyl or methyl;
$R_6$ is hydrogen, alkyl of 1–30 carbons or aryl;

may optionally be nitro;
Y is nitrogen;
$R_7$ and $R_8$ each are hydrogen, methyl, benzyl, oxygen or tosyl;
$R_9$ is hydrogen, halogen, hydroxyl or amino; and
$R_8$-Y< may optionally be methylene or oxygen.

2. Plastics molding composition as claimed in claim 1, wherein the polymer is a polyolefin.

3. Plastics molding composition as claimed in claim 1, wherein the polymer is a halogen containing polymer.

* * * * *